US007299844B2

(12) United States Patent
Lisec

(10) Patent No.: US 7,299,844 B2
(45) Date of Patent: Nov. 27, 2007

(54) DEVICE FOR ASSEMBLY OF INSULATING GLASS SHEETS WITH AN INTERIOR FILLED WITH A HEAVY GAS

(75) Inventor: Peter Lisec, Amstetten-Hausmening (AT)

(73) Assignee: Tecnopat AG, St. Gallen (CH)

( * ) Notice: Subject to any disclaimer, the term of this patent is extended or adjusted under 35 U.S.C. 154(b) by 328 days.

(21) Appl. No.: 10/765,886

(22) Filed: Jan. 29, 2004

(65) Prior Publication Data

US 2004/0182518 A1 Sep. 23, 2004

(30) Foreign Application Priority Data

Feb. 22, 2003 (EP) .................................. 03003986

(51) Int. Cl.
*C03C 27/00* (2006.01)
*B65B 31/06* (2006.01)

(52) U.S. Cl. ...................... 156/381; 156/497; 156/539; 156/109; 141/4; 141/66

(58) Field of Classification Search ..................... None
See application file for complete search history.

(56) References Cited

U.S. PATENT DOCUMENTS 4,369,084 A * 1/1983 Lisec ......................... 156/382
5,476,124 A * 12/1995 Lisec ............................ 141/4
5,676,782 A 10/1997 Lisec

FOREIGN PATENT DOCUMENTS

DE 93 02 744 5/1994
DE 4315986 * 11/1994
DE 44 19 052 A1 12/1995
EP 0 674 086 B1 9/1995

* cited by examiner

*Primary Examiner*—Jessica Ward
(74) *Attorney, Agent, or Firm*—Young & Thompson

(57) ABSTRACT

A device for producing heavy gas-filled insulating glass sheets (62, 64, 60) has two plates (4, 6), between which the insulating glass sheet (62, 64, 60) which is to be filled can be located. On the vertical edges of the plates (4, 6) there are sealing devices (12) to seal the space (10) between the plates (4, 6). On the lower edge of the plates (4, 6) there are a conveyor means (40) for insulating glass and a channel (44) for the supply of heavy gas into the space (10) between the plates (4, 6) and into the interior (60) of the insulating glass sheets (62, 64, 60). In one of the plates (4, 6) there is a seal (20) which extends solely transversely to the plane of the plate (4) from bottom to top essentially vertically and which is located for example in the (lengthwise) middle of the plate (4).

3 Claims, 2 Drawing Sheets

DEVICE FOR ASSEMBLY OF INSULATING GLASS SHEETS WITH AN INTERIOR FILLED WITH A HEAVY GAS

BACKGROUND OF THE INVENTION

The invention relates to a device for assembly of insulating glass sheets with an interior filled with a heavy gas.

One such device is known from EP 0 674 086 B.

The known device has two plates, between which an insulating glass sheet which is open at least on its lower edge (package of (at least) two glass plates and (at least) one spacer frame between them) is located and is filled from the bottom with heavy gas. The known device, to limit the space which is filled with the heavy gas when the insulating glass sheet is being filled, has an essentially vertical seal which is adjustable in the direction of the plane of the plates and which is aligned such that the seal in the actual filling process is located in the immediate vicinity of one vertical edge of the insulating glass sheet which is to be filled (FIG. 3 of EP 0 674 086 B1).

EP 0 674 086 B1 also describes an embodiment of a device for filling the insulating glass sheets with a heavy gas, in which there are two plates, the heavy gas flowing out of a channel from underneath into the space between the plates. On one end of the pressure plates there is a seal which can be swivelled in and on the other end there is a seal which can be adjusted in the direction of the plane of the plates.

SUMMARY OF THE INVENTION

The object of the invention, proceeding from the device for assembly of insulating glass sheets with an interior filled with heavy gas according to EP 0 674 086 B1, is to propose a simplified device in which the time expenditure which is necessary for the filling of the insulating glass sheet with heavy gas and for assembling the insulating glass sheet which is filled with heavy gas is shortened.

Since in the device as claimed in the invention on one of the two plates, preferably on the plate which is located stationary in the machine frame, there is a seal which is adjustable only transversely to the plane of the plate and which is aligned essentially vertically, the effort for aligning the seal is eliminated such that it is assigned to the edge of the insulating glass sheet which is located within the pressure plates.

Another advantage of the device as claimed in the invention is that the seal which is provided in one plate and which is located for example running from top to bottom roughly in the lengthwise center of the plate need not be moved away out of the space between the plates, when a completely filled and assembled insulating glass sheet (both sheets then adjoin the spacer peripherally) is transported out of the device, since it is sufficient to simply draw the seal back into the plate, or in an embodiment in which the seal is provided on the movable plate to move the plate bearing the seal simply so far back that the removal of the insulating glass sheet from the device is not hindered.

In the device as claimed in the invention, insulating glass sheets can be filled in which the spacer frame adjoins one glass sheet peripherally and in which the second glass sheet adjoins the spacer frame only with its upper horizontal edge so that on the lower edge of the insulating glass sheet a gap is open. This manner of operation corresponds in principle to the one described using FIGS. 1 and 3 of EP 0 674 086 B1. Heavy gas can enter the interior of the insulating glass sheet through this gap between the spacer frame and the second glass sheet from underneath.

The device as claimed in the invention can however also be used such that there is a glass sheet in the space between the plates and a second glass sheet covered with the spacer frame is aligned opposite the first glass sheet in the device without the first glass sheet touching the spacer frame anywhere. This is generally done such that the second glass sheet is held fast by negative pressure on the assigned plate of the device and is moved laterally out of the conveyor path. This corresponds in principle to the manner of operation described using FIGS. 3 to 6 of EP 0 674 086 B1.

The heavy gas is supplied to the lower edge of the insulating glass sheet preferably using a channel similar to that described in EP 0 674 086 B1, in the channel in the invention however there not being a device (piston) to limit the effective length of the channel to the length of the insulating glass sheet measured in the horizontal direction. Rather, in the device as claimed in the invention the channel is divided in the area of at least one seal and each section of the channel is made with a line for supply of heavy gas.

As already indicated, in the device as claimed in the invention there can also be two or more seals which are adjustable solely transversely to the plane of one plate.

On the two vertical edges of the plates there are sealing devices, for example simple flaps to seal the space between the plates to the outside when the insulating glass sheet is being filled with heavy gas or an insulating glass sheet which is filled with a heavy gas is being assembled.

In the device as claimed in the invention with two plates, of which one is mounted permanently in the machine frame and the other is adjustable in the machine frame transversely to its surface extension it is possible to provide an adjustable seal in the plate which has been mounted stationary. In one alternative embodiment the adjustable seal is located on the adjustable plate of the device.

The device as claimed in the invention can also be set up such that completely filled insulating glass sheets can also be pressed into it so that insulating glass sheets finished for sealing can also be removed from it.

BRIEF DESCRIPTION OF THE DRAWINGS

Other details, features and advantages of the device as claimed in the invention follow from the description of preferred embodiments using the drawings below.

DESCRIPTION OF THE PREFERRED EMBODIMENTS

Figure 1:
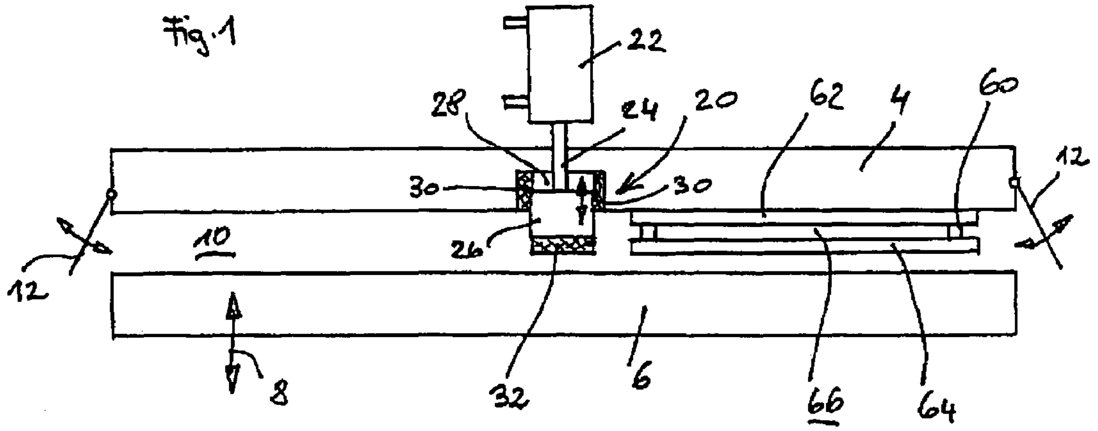
FIG. 1 schematically shows in an overhead view a device as claimed in the invention in the opened position.

In the machine frame 2 there are two plates 4 and 6 which are placed roughly obliquely to the vertical, as usual, one plate 4 being fixed to the machine frame 2, conversely the other plate 6 can be moved relative to the first plate 4 (arrow 8) in order to be able to change the width of the space 10 between the plates 4, 6.

On the two essentially vertical edges of the plates 4 and 6 there are sealing devices 12, in this embodiment simple swivelling flaps, with which the space 10 between the places 4, 6 can be sealed to the outside.

In the stationary plate 4 in the embodiment shown there is a seal 20 which is adjustable solely transversely to the plane of the plate 4 and which is made continuous from the lower edge of the plate 4 to the upper edge of the latter.

To move the seal 20 it is coupled to at least one hydraulic motor 22 via connecting rods. The connection of the seal 20, especially of its base body 26, to the connecting rods 24 of the hydraulic motor 22 can be made elastic transversely to the plane of the plate 4 in order to achieve a certain pliability of the seal 20 when the device is closed.

The seal 20 is routed with its base body in a groove-like recess 28 of the plate 4, forming a seal, which recess is open toward the space 10 and which is continuous from top to bottom. In this embodiment sealing is effected by placing the base body 26 of the adjustable seal 20 against the sealing strips 30 which are located in the side walls of the groove 28. Any other type of seal, for example using bellows or the like, is conceivable. On the front surface the seal 20 is covered with a strip 32 of elastically pliable sealing material, for example an elastic foam.

On the bottom edge of the plates 4 and 6 there is a conveyor device 40 with two transport belts 42 which run lengthwise and between which exit openings 46 discharge which proceed from the channel 44 for the heavy gas with which the insulating glass sheet is to be filled. Here the exit openings 46 are aligned such that they are located opposite the spacer frame 60 which is placed on one glass sheet 62. The channel 44 is divided into two sections in the area of the vertical seal 20. Each of the two sections of the channel 44 has a feed line for heavy gas, which sections can be filled with heavy gas independently of one another.

When an insulating glass sheet is to be filled, it is assembled in an upstream device for example such that one glass sheet 64 adjoins the spacer frame 60, on its top horizontal leg, simply with its upper horizontal edge, but has a distance from the spacer frame 60 underneath so that the insulating glass sheet (better, the package of glass sheets) is open to the bottom so that heavy gas can enter the interior 66 of the insulating glass sheet. The insulating glass sheet which is still open to the bottom is moved vertically on the conveyor belts 42 into the space 10 between the plates 4 and 6, for which on the plate 4 which is mounted permanently in the machine frame there can be rollers and/or exit openings for formation of an air cushion. At this point the adjustable plate 6 has approached the stationary plate 4 to such an extent that it is barely next to the lower edge of the oblique glass sheet 64, which lies only with the upper horizontal edge against the spacer frame. Furthermore the seal 20 is pushed onto the plate 6 until it adjoins the movable plate 6. Thereupon the section of the channel 44 over which an insulating glass sheet to be filled is located is exposed to the heavy gas until the insulating glass sheet is completely filled with heavy gas. Then a movable plate 6 is pushed farther onto the stationary plate 4 so that the glass sheet 64 which is initially tilted adjoins the spacer frame 60 in its entirely, i.e. with its entire periphery. If the device is set up for this purpose the insulating glass sheet which has been closed in this way in the device is also pressed and the insulating glass sheet is then filled with heavy gas and is ready for sealing the edge joint in a downstream device (automatic sealing unit).

When the device as claimed in the invention is being used for assembly of an insulating glass sheet which is filled with a heavy gas, first a glass sheet is transported into the device, fixed on the adjustable plate 6, for example by suction, and raised off the conveyor path. Then, adjoining the stationary plate 4 a glass sheet 62 which is covered with a spacer frame 60 is conveyed until it is opposite the glass sheet 64 which is fixed on the plate 6. Then the flaps 12 are closed on the edges of the plates 4, 6, the seal 20 is pushed onto the plate 6 and the filling process can begin by routing heavy gas in from the channel 44. After the filling process is ended, the plate 6 is advanced until the glass sheet 64 which has been fixed on the plate 6 entirely adjoins the spacer frame 60. Optionally the insulating glass sheet which has been formed in this way can also be pressed.

In both cases, to remove the insulating glass sheet consisting of the glass sheets 62, 64 and the spacer frame 60 (in multipane insulating glass for example three sheets of glass with two spacer frames) after the seal 20 has been pulled completely back into the groove 28, it is removed from the device.

Figure 3:
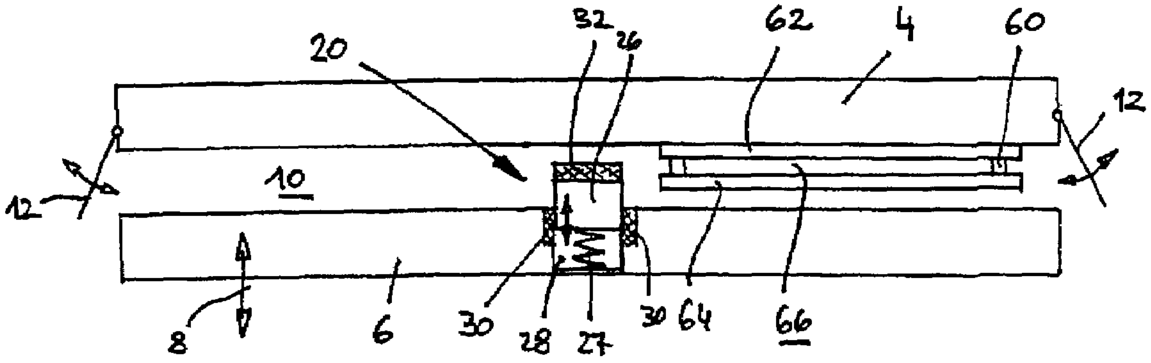
FIG. 3 shows in a view similar to FIG. 1 one embodiment with a seal located in the movable plate.

In the embodiment shown in FIG. 3 the seal 20 is provided in the movable plate 6 of the device to be adjustable solely transversely to the plane of the plate 6 in a groove 28 which is provided in the plate.

Otherwise the construction of the seal 20 with its base body 32 corresponds to its strip of elastic material 32 and the sealing relative to the side walls of the groove 28 of the embodiment described using FIG. 1.

Figure 2:
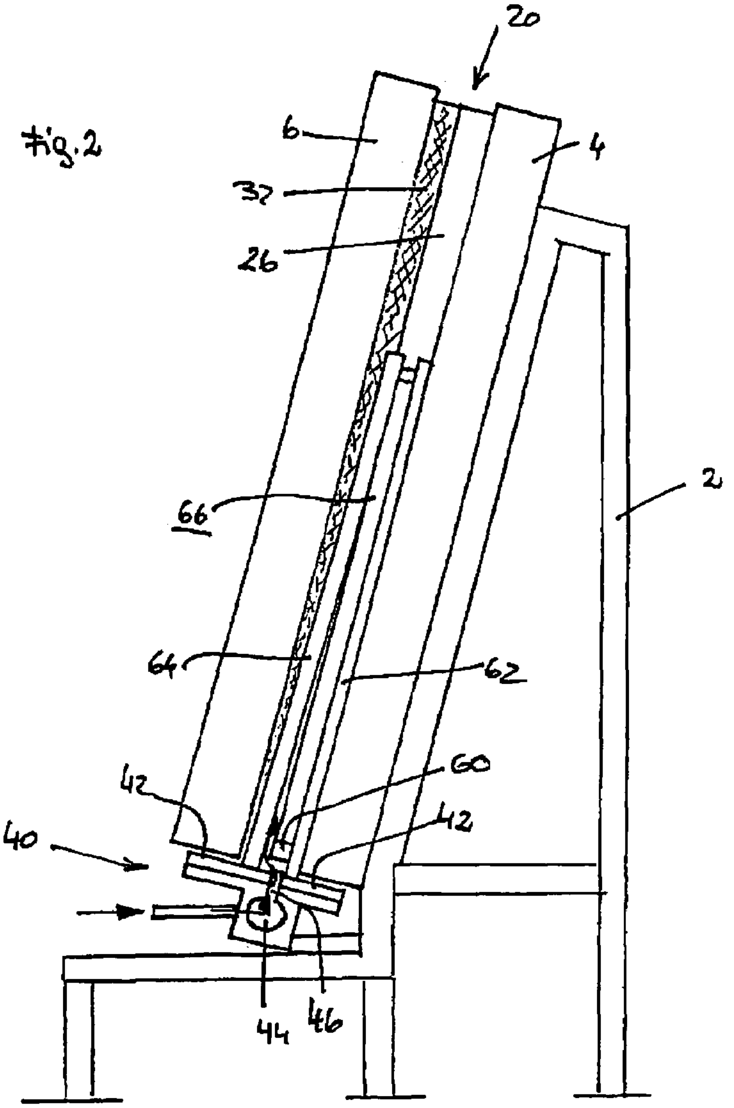
FIG. 2 shows a device as claimed in the invention in a side view in the filling process.

The embodiment shown in FIG. 3 does not require the hydraulic motors 22 provided in the embodiment from FIG. 1 for moving the seal 20 transversely to the plane of the plate 6. Rather, it is sufficient if the seal 20 is loaded by elastic means, for example springs 27 or elastic gas cylinders into its advanced position which is shown in FIG. 3. Regardless, even in this preferred embodiment there can be a drive for pulling back the seal 20 which is adjustable transversely to the plate 6, for example at least one hydraulic motor. When the plate 6 moves in the direction of the double arrow 8 onto the stationary plate 4 to the position shown in FIG. 2 for the embodiment from FIG. 1, the seal 20 with its elastic strips 32 rests on the inside surface of the plate 4 so that sealing of the space in which the package of two glass sheets 62, 64 and the spacer frame is located is achieved. If the insulating glass sheet is filled with gas and is closed (optionally has also been pressed) the plate 6 with the seal 20 is pulled back so far that the sheet 6 can be removed unhindered.

If in the embodiment shown in FIG. 3 an insulating glass sheet is to be filled which projects over the seal 20, is therefore longer than the insulating glass sheet shown schematically in FIG. 3, the seal 20 is pressed back simply by the glass sheet of a still open insulating glass sheet or of a package of sheets and does not hinder the filling process.

In summary one preferred embodiment of the invention is described as follows:

A device for producing insulating glass sheets 62, 64, 60 which are filled with heavy gas has two plates 4, 6 between which the insulating glass sheet which is to be filled can be placed. On the vertical edges of the plates 4, 6 there are sealing elements 12 for sealing the space 10 between the plates 4, 6. On the lower edge of the plates 4, 6 there is a conveyor means 40 for insulating glass and a channel 44 for the supply of heavy gas into the space 10 between the plates 4, 6 and into the interior 60 of the insulating glass sheets 62, 64, 60. In one of the plates 4, 6 there is a seal 20 which extends solely transversely to the plane of the plate 4 from bottom to top essentially vertically and which is located for example in the (lengthwise) middle of the plate 4.

The invention claimed is:

1. Device for producing heavy gas-filled insulating glass sheets comprising:

two essentially vertical plates positioned on opposite sides of at least one conveyor for an insulating glass sheet which is to be filled with heavy gas; and at least one seal oriented essentially vertically in a space between the plates;

wherein the seal is movable solely perpendicular to a plane of the plates; and wherein on two vertical edges of the plates there are additional seals for sealing the space between the plates to the outside.

2. Device for producing heavy gas-filled insulating glass sheets comprising:

two essentially vertical plates positioned on opposite sides of at least one conveyor for an insulating glass sheet which is to be filled with heavy gas; and at least one seal oriented essentially vertically in a space between the plates;

wherein the seal is extensible from and retractable into a vertically extending groove via movements solely perpendicular to the plane of the plates, said vertically extending groove being provided in a central region of said plates.

3. Device for producing heavy gas-filled insulating glass sheets comprising:

two essentially vertical plates positioned on opposite sides of at least one conveyor for an insulating glass sheet which is to be filled with heavy gas; and at least one seal oriented essentially vertically in a space between the plates;

wherein the seal is extensible from a vertically extending groove via solely linear motion in a first direction and retractable into said vertically extending groove via solely linear motion in a second direction opposite to said first direction, said vertically extending groove being provided in a central region of said plates.

* * * * *